US008719248B2

(12) United States Patent
Mukhopadhyay et al.

(10) Patent No.: US 8,719,248 B2
(45) Date of Patent: May 6, 2014

(54) SEMANTIC-BASED SEARCH ENGINE FOR CONTENT

(75) Inventors: Aveek Mukhopadhyay, New Delhi (IN); Suman Mukherjee, Dhanbad (IN); Krithika Swayambhu, Chennai (IN); Vijay Prabhu Baskaran, Chennai (IN); Jubish Cheriya Parambath, Chennai (IN); Anand N. Sankaran, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 182 days.

(21) Appl. No.: 13/116,305

(22) Filed: May 26, 2011

(65) Prior Publication Data
US 2012/0303600 A1 Nov. 29, 2012

(51) Int. Cl.
*G06F 17/30* (2006.01)
(52) U.S. Cl.
USPC .......................................... 707/706; 707/765
(58) Field of Classification Search
USPC ............ 707/728, 100, 5, 740, 706, 765, 749, 707/723; 706/47
See application file for complete search history.

(56) References Cited

U.S. PATENT DOCUMENTS

| 7,689,556 | B2 * | 3/2010 | Garg et al. ..................... 707/765 |
|---|---|---|---|
| 8,117,211 | B2 * | 2/2012 | Yamamoto et al. ........... 707/749 |
| 2005/0203931 | A1 * | 9/2005 | Pingree et al. ................ 707/100 |
| 2008/0097941 | A1 * | 4/2008 | Agarwal ......................... 706/12 |
| 2009/0177651 | A1 * | 7/2009 | Takamatsu et al. ............... 707/5 |
| 2010/0235313 | A1 * | 9/2010 | Rea et al. ........................ 706/52 |
| 2011/0145232 | A1 * | 6/2011 | Chang et al. ................... 707/728 |
| 2011/0252359 | A1 * | 10/2011 | England et al. ............... 715/781 |
| 2011/0295843 | A1 * | 12/2011 | Ingrassia et al. .............. 707/723 |
| 2012/0023055 | A1 * | 1/2012 | Dagaeff .......................... 706/47 |
| 2012/0023104 | A1 * | 1/2012 | Johnson et al. ............... 707/740 |

* cited by examiner

*Primary Examiner* — James Trujillo
*Assistant Examiner* — Thong Vu

(57) ABSTRACT

A method storing information that indicates similarity between contents based on content metadata associated with each content, wherein a degree of similarity between contents is based on a semantic interpretation of plot metadata included in content metadata and pertaining to each plot associated with each content; receiving a search query from a user; retrieving one or more content metadata pertaining to one or more contents based on the search query; retrieving one or more recommended content metadata pertaining to one or more recommended contents that are similar to the one or more content metadata pertaining to the one or more contents based on the stored information; and providing a search result that includes the one or more content metadata and the one or more recommended content metadata via a user interface.

20 Claims, 11 Drawing Sheets

SEMANTIC-BASED SEARCH ENGINE FOR CONTENT

BACKGROUND

Service providers (SPs) are continually trying to improve customer relationship management (CRM) systems. CRM systems may enhance the quality of service provided by service providers as well as improve customer experience and satisfaction. For example, service providers may offer content that customers may view. Service providers may provide a search engine that allows customers to search for particular content of interest.

DETAILED DESCRIPTION OF PREFERRED EMBODIMENTS

Figure 1:
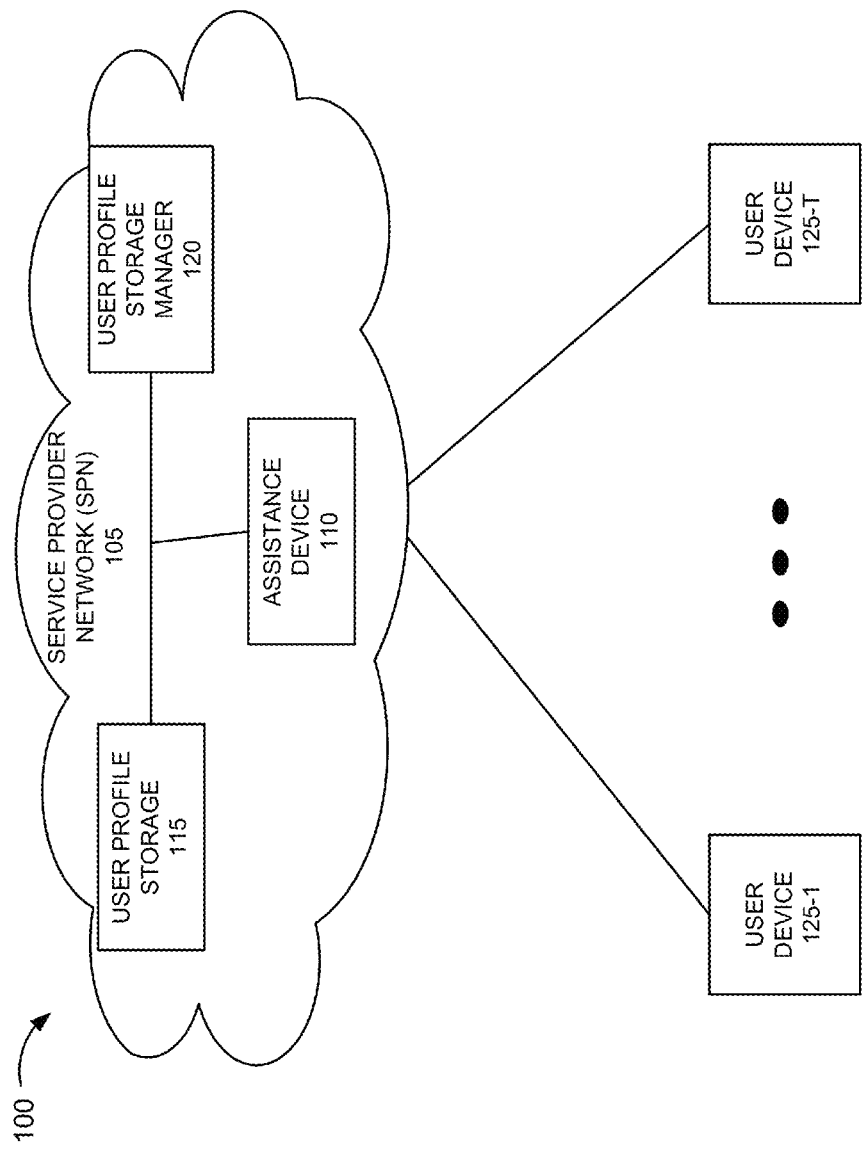
FIG. 1 is a diagram illustrating an exemplary environment in which an exemplary embodiment of a search engine may be implemented.

The following detailed description refers to the accompanying drawings. The same reference numbers in different drawings may identify the same or similar elements. Also, the following detailed description does not limit the invention.

The term "content" as used herein, is intended to be broadly interpreted to include, for example, visual data, audio data, a combination of audio data and visual data, or other forms of media content. By way of example, content may include television content and Internet content. Television content may include, for example, video-on-demand (VoD) content, premium channel content, and pay-per-view (PPV) content. Additionally, the television content may include television shows or other types of television programming. Internet content may include podcasts, web sites, etc. The content may be in various formats, such as, for example, standard definition, high-definition, 3-D, etc. As used herein, content may refer to a single piece of content (e.g., a program) or multiple pieces of content (e.g., programs).

According to an exemplary embodiment, a search engine may search for content and generate recommendations of content that are similar to a searched content (e.g., content matching or retrieved by the search engine based on a search query). For example, when a customer enters a search query for a "Movie A," the search engine may provide a search result that pertains to "Movie A" and one or more other movies that satisfy a threshold strength or degree of similarity with "Movie A." According to an exemplary embodiment, the search engine may identify similar content by accessing a repository that stores information indicating similarities between content.

According to an exemplary embodiment, a content storage manager may manage the repository. According to an exemplary embodiment, the content storage manager may calculate similarities between content based on metadata pertaining to content. By way of example, the metadata may pertain to the genre, the sub-genre, the plot, the cast, and the director of the content. According to other implementations, additional, fewer, or different types of metadata may be used to calculate similarities. For example, the metadata may pertain to the release date of the content, critics' ratings of the content, rating of the content (e.g., G, PG-13, R, etc.), film festival award(s) or selection(s) attributed to the content, film company or studio associated with the content, other crew members (e.g., producer, screen writer, executive producer, etc.), language, etc.

According to an exemplary embodiment, the content storage manager may identify a similarity between content when content share the same genre, sub-genre, cast, etc. For example, if two movies are directed by Chris Nolan, then the two movies would share a certain degree of similarity. Unlike other types of metadata, identifying similarities or dissimilarities between plots is more complex. For example, a plot, which is in the form of a synopsis or a summary, is typically written in prose. According to other implementations, the plot may provide a more detailed description of the content relative to a summary. For example, the plot may include a description of the content from the beginning to the end. According to an exemplary embodiment, the content storage manager may perform a semantic synthesis of the metadata pertaining to plot metadata to identify similarities between content.

According to an exemplary embodiment, the repository may store information that indicates similarities between content. For example, the information may take the form of a directed graph in which nodes of the directed graph correspond to content metadata and the connections or links between the nodes correspond to multi-edges based on the content metadata. For example, each edge of a multi-edge link may pertain to a particular type of metadata. According to an exemplary embodiment, an edge may be assigned a particular weight based on the type of metadata. According to an exemplary embodiment, the weight of each edge may be used to calculate the strength or the degree of similarity between content. According to an exemplary embodiment, the search engine may select content metadata similar to a searched content based on the directed graph information stored in the repository and managed by the content storage manager.

FIG. 1 is a diagram illustrating an exemplary environment 100 in which an exemplary embodiment of a search engine may be implemented. As illustrated in FIG. 1, environment 100 may include a service provider network (SPN) 105 and customer premises 150-1 through 150-N (referred to as customer premises 150). Service provider network 105 may include, among other devices, a search engine 110, a content storage 115, and a content storage manager 120. Customer premises 150 may include, among other devices, televisions (TVs) 155-1 through 155-N (referred to generally as TV 155 or TVs 155), SPN TV interface devices 160-1 through 160-N (referred to generally as SPN TV interface device 160 or SPN TV interface devices 160), remote devices 165-1 through 165-N (referred to generally as remote device 165 or remote devices 165), user devices 170-1 through 170-N (referred to generally as user device 170 or user devices 170), and SPN Internet interface devices 175-1 through 175-N (referred to generally as SPN Internet interface device 175 or SPN Internet interface devices 175). Environment 100 may include wired and/or wireless connections among the devices illustrated.

The number of devices and networks, and the configuration in environment 100 are exemplary and provided for simplicity. According to other embodiments, environment 100 may include additional devices, fewer devices, different devices, and/or differently arranged devices, than those illustrated in FIG. 1. For example, SPN TV interface device 160 and TV 155 may be implemented as a part of user device 170. Additionally, or alternatively, for example, customer premises 150 may not include one or more of TV 155, SPN TV interface device 160, remote device 165, user device 170, or SPN Internet interface device 175. According to other embodiments, a single device may be implemented as multiple devices and/or multiple devices may be implemented as a single device. For example, although search-engine 110 and content storage manager 120 are illustrated as separate devices, search engine 110 and content storage manager 120 may be combined into a single device.

Environment 100 may include additional networks, fewer networks, and/or differently arranged networks, than those illustrated in FIG. 1. For example, customer premises 150 may include a local area network (LAN). Additionally, or alternatively, environment 100 may include intermediary networks, which are not illustrated in FIG. 1. According to other embodiments, one or more functions and/or processes described as being performed by a device may be performed by a different device or a combination of devices.

Service provider network 105 may include a network that distributes or makes available a service, such as, a television service. Service provider network 105 may also include a network that provides Internet service and/or mobile service. Service provider network 105 may be implemented as a satellite-based network and/or a terrestrial-based network. Although not illustrated, service provider network 105 may include, for example, content distribution devices, application servers, billing devices, security devices, etc.

Search engine 110 may include a search engine to search for content based on search a query. According to an exemplary embodiment, search engine 110 may provide search results that include recommended content that is/are similar (e.g., semantically) to content selected based on the search query. According to an exemplary embodiment, search engine 110 may provide a search result for content using non-semantic-based methods. For example, search engine 110 may provide a search result that matches keywords. Search engine 110 may also provide a search result that includes recommended content based on other customer's viewership. For example, search engine 110 may recommend content frequently watched by customers who also watched the content matching the search criteria. Search engine 110 may also take such factors into consideration when provided recommended content this is/are similar (e.g., semantically) to content selected based on the search query.

According to an exemplary embodiment, search engine 110 may be implemented within a video-on-demand system. For example, the video-on-demand system may be accessible to customers via a television service. Additionally, or alternatively, search engine 110 may be accessible to customers via an Internet service and/or a mobile service.

Search engine 110 may be implemented by one or multiple network devices. For example, the network device(s) may include a computational device (e.g., a computer, a server, an application server, a web server, etc.). Search engine 110 may provide user interfaces to customers for, among other things, searching content, providing search results, and recommending content. Search engine 110 is described further below.

Content storage 115 may store information pertaining to the similarity between content. According to an exemplary embodiment, the information may be stored as a directed graph. According to other embodiments, the information may be stored as a different type of data structure (e.g., matrices, etc.). Content storage 115 may be implemented by one or multiple network devices. For example, the network device(s) may include a storage device (e.g., a hard disk or other tangible storage medium) and/or a computational device (e.g., a computer, a server, etc.).

Content storage manager 120 may manage content storage 115 including calculating similarities between content based on the metadata associated with the content. According to an exemplary embodiment, content storage manager 120 may calculate the strength or degree of similarity between content based on a semantic synthesis of metadata pertaining to the plots associated with the content. According to an exemplary embodiment, content storage manager 120 may calculate the strength or degree of similarity between content based on a weighting system associated with the metadata. Content storage manager 120 may be implemented by one or multiple network devices. For example, the network device(s) may include a computational device (e.g., a computer, a server, an application server, a database server, etc.). Content storage manager 120 will be described further below.

Customer premises 150 may include a location where customer(s) receive services from service provider network 105. For example, customers may receive services at home, at work, or locations while customers are mobile. As illustrated, customer premises 150 may include devices that allow customers to receive services, such as, for example, television and Internet from service provider network 105. As illustrated, customer premises 150 may include exemplary customer premise equipment, such as, for example, TVs 155, SPN TV interface devices 160, remote devices 165, user devices 170, and SPN Internet interface devices 175.

TV 155 may include a device to display content. According to an exemplary embodiment, TV 155 may correspond to a television. According to other embodiments, TV 155 may correspond to other types of display devices, such as, for example, a monitor, a mobile device having a display, a laptop computer, user device 170, etc. According to an exemplary embodiment, TV 155 and SPN TV interface device 160 may be separate devices, as illustrated in FIG. 1. According to other embodiments, TV 155 may include SPN TV interface device 160 or include some of the functionalities associated with SPN TV interface device 160.

SPN TV interface device 160 may include a device that communicates with service provider network 105 to provide television services and/or content to a customer. According to an exemplary embodiment, SPN TV interface device 160 may include a client, a thin client, a set-top box, a converter box, a receiver, a server, a peer device, a tuner, and/or a digibox. According to an exemplary embodiment, SPN TV interface device 160 may also include a digital video recorder (DVR) and/or a hard drive. SPN TV interface device 160 may also provide multi-room services.

Remote device 165 may include a device that communicates with TV 155 and/or SPN TV interface device 160 to allow a customer to interact with SPN TV interface device 160 and/or TV 155. Remove device 165 may also include a device that communicates with other devices in communication with TV 155 and/or SPN TV interface device 160. Remote device 165 may include one or multiple input mechanisms (e.g., buttons, a display, a touchpad, a microphone, etc.)

to receive a customer's (e.g., user's) input and, among other things, allow the customer to interact with TV 155 and/or SPN TV interface device 160. For example, remote device 165 may correspond to a remote control device (e.g., a set-top box controller, a TV controller, a converter box controller, etc.).

User device 170 may include, for example, a mobile device, a stationary device, a handheld device, a tablet device, or some other type of portable device. For example, user device 170 may include a computational device (e.g., a desktop computer, a laptop computer, a palmtop computer, etc.), or a communication device (e.g., a wireless phone, a wired phone, an Internet-access device, etc.). User device 170 may be capable of communicating with one or more devices in customer premises 150 and/or service provider network 105. Additionally, as previously described, user device 170 may include one or more of the devices described in customer premises 150, such as, for example, TV 155, remote device 165, SPN TV interface 160, etc.

SPN Internet interface device 175 may include a device that communicates with service provider network 105 to provide Internet services and/or Internet content to a customer. SPN Internet interface device 175 may also communicate with other devices associated with customer premises 150. For example, SPN Internet interface device 175 may include a modem, a wireless router, a wired router, a gateway, or some other type of communication device.

Figure 2:
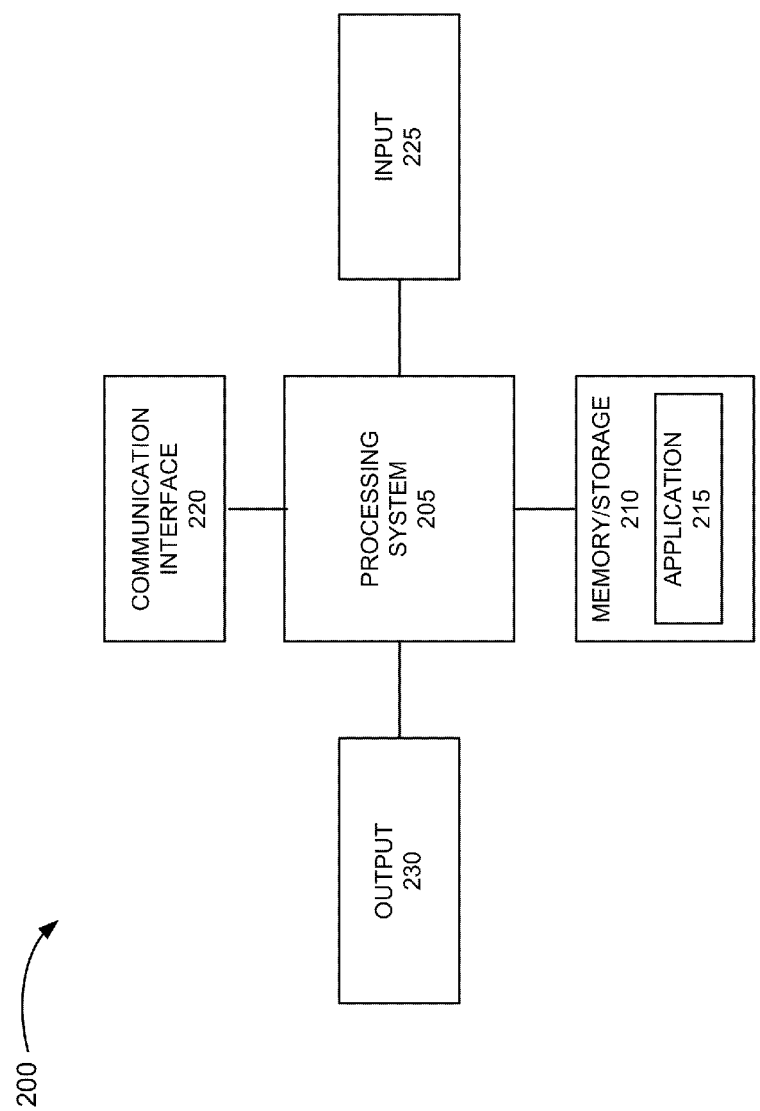
FIG. 2 is a diagram illustrating exemplary components of a device that may correspond to one or more of the devices in the environment depicted in FIG. 1.

FIG. 2 is a diagram illustrating exemplary components of a device 200 that may correspond to one or more of the devices in environment 100. For example, device 200 may correspond to one or more devices in SPN 105 and/or one or more devices in customer premises 150. As illustrated, according to an exemplary embodiment, device 200 may include a processing system 205, memory/storage 210 including an application 215, a communication interface 220, an input 225, and an output 230. According to other embodiments, device 200 may include fewer components, additional components, different components, and/or a different arrangement of components than those illustrated in FIG. 2 and described herein.

Processing system 205 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SOCs), central processing units, microcontrollers, and/or some other component that may interpret and/or execute instructions and/or data. Depending on the type of processing system 205, processing system 205 may be implemented as hardware, a combination of hardware and software, may include one or multiple memories (e.g., memory/storage 210), etc.

Processing system 205 may control the overall operation or a portion of operation(s) performed by device 200. Processing system 205 may perform one or multiple operations based on an operating system and/or various applications (e.g., application 215). Processing system 205 may access instructions from memory/storage 210, from other components of device 200, and/or from a source external to device 200 (e.g., a network, another device, etc.).

Memory/storage 210 may include one or multiple memories and/or one or multiple other types of tangible storage mediums. For example, memory/storage 210 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 210 may include a hard disk (e.g., a magnetic disk, an optical disk, a magneto-optic disk, a solid state disk, etc.) a floppy disk (e.g., a zip disk, etc.), a tape, a Micro-Electromechanical System (MEMS)-based storage medium, and/or a nanotechnology-based storage medium. Memory/storage 210 may include drives for reading from and writing to the tangible storage medium.

Memory/storage 210 may be external to and/or removable from device 200, such as, for example, a Universal Serial Bus (USB) memory stick, a dongle, a hard disk, mass storage, off-line storage, or some other type of storing medium (e.g., a computer-readable medium, a compact disk (CD), a digital versatile disk (DVD), a Blu-Ray® disk (BD), etc.). Memory/storage 210 may store data, application(s), and/or instructions related to the operation of device 200.

Application 215 may include software or a program that provides various services and/or functions. For example, with reference to search engine 110, application 215 may include a search engine application or program to, among other things, search content and select content having similarities to other content, as described herein. Additionally, for example, with reference to content storage manager 120, application 215 may include a content similarity application to, among other things, calculate similarities between content based on the metadata associated with the content. Additionally, for example, with reference to SPN TV interface device 160, application 215 may include an application or a program for providing content via TV 155, provide user interfaces, etc. Other devices (e.g., user device 170, etc.) illustrated in environment 100 may include an application to provide various services and/or functions.

Communication interface 220 may permit device 200 to communicate with other devices, networks, systems, etc. Communication interface 220 may include one or multiple wireless interfaces and/or wired interfaces. Communication interface 220 may include one or multiple transmitters, receivers, and/or transceivers. Communication interface 220 may operate according to one or multiple protocols, standards, and/or the like.

Input 225 may permit an input into device 200. For example, input 225 may include a keyboard, a mouse, a camera, a scanner, a microphone, a display, a touchpad, a button, a switch, an input port, voice recognition logic, fingerprint recognition logic, a web cam, and/or some other type of visual, auditory, tactile, etc., input component. Output 230 may permit an output from device 200. For example, output 230 may include a speaker, a display, a light, an output port, and/or some other type of visual, auditory, tactile, etc., output component.

Device 200 may perform processes and/or functions, as described herein, in response to processing system 205 executing instructions (e.g., application 215) stored by memory/storage 210. By way of example, the instructions may be read into memory/storage 210 from another memory/storage 210 or from another device via communication interface 220. The instructions stored by memory/storage 210 may cause processing system 205 to perform one or more processes described herein. Alternatively, for example, according to other implementations, device 200 may perform one or more processes described herein based on the execution of hardware (processing system 205, etc.), the execution of hardware and firmware, or the execution of hardware, software, and firmware.

Figure 3A:
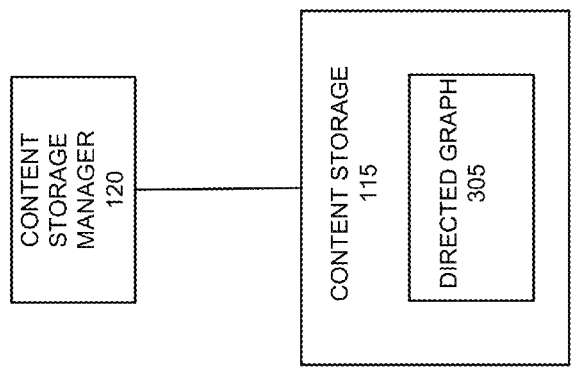
FIGS. 3A-3C are diagrams illustrating an exemplary embodiment of a multi-edged directed graph.

As previously described, content storage manager 120 may use metadata associated with content as a basis to calculate and identify similarities between content. According to an exemplary embodiment, content storage manager 120 may store information regarding content in the form of a metadata-based directed graph. For example, as illustrated in FIG. 3A, content storage 115 may include a directed graph 305.

Figure 3B:
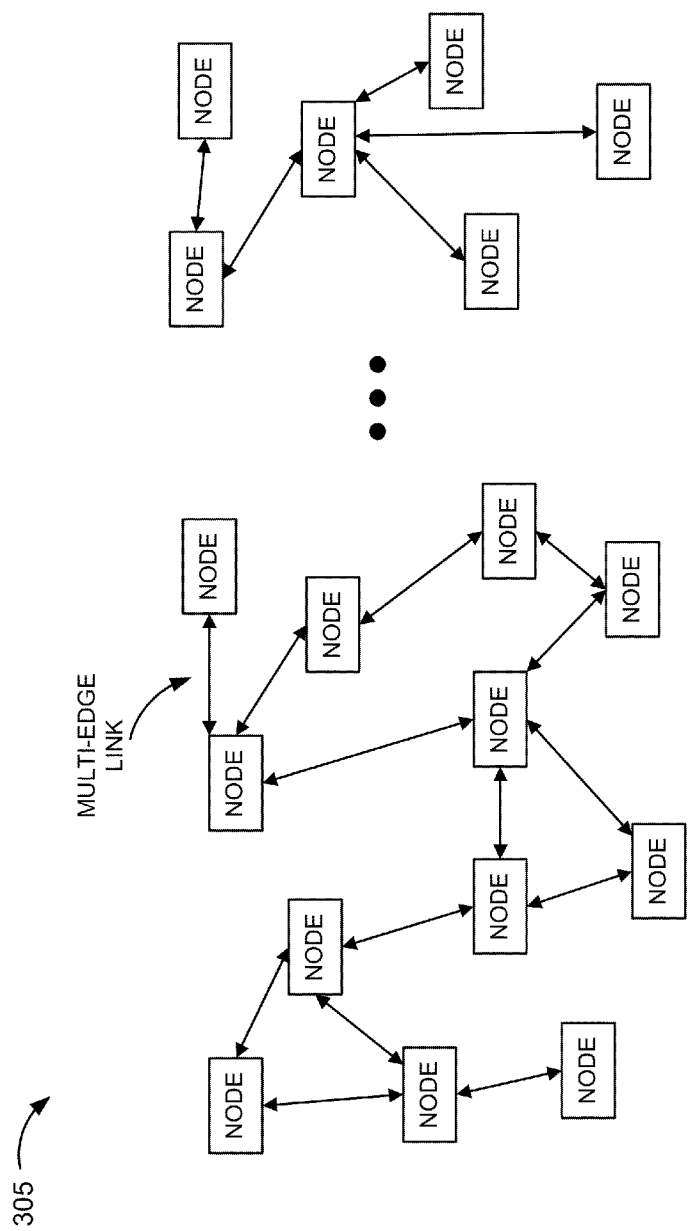

According to an exemplary embodiment, directed graph 305 may be a multi-edged directed graph, as illustrated in FIG. 3B. According to such an embodiment, each edge of a multi-edge link corresponds to a particular type of metadata. For example, one edge may pertain to the cast of the content, another edge may pertain to the genre of the content, etc. According to an exemplary embodiment, an edge may be assigned a particular weight based on the edge type (i.e., the type of metadata). For example, the weight of an edge corresponding to the director of the content may be different than the weight of an edge corresponding to a cast member. According to an exemplary implementation, a summation of each weight associated with each edge shared between content may be used to calculate the strength or degree of similarity between content. By way of example, assume that content storage manager 120 is calculating the similarity between content m and content n. Content storage manager 120 may calculate the similarity based on the following exemplary expression:

$$S_{m,n} = \sum_{i=1}^{n} w_i f_i,$$

in which i indicates the number of metadata (e.g., i...n=1...5) or the number of types of metadata, w indicates the weight attributed to the metadata type, and f indicates the type of metadata.

Figure 3C:
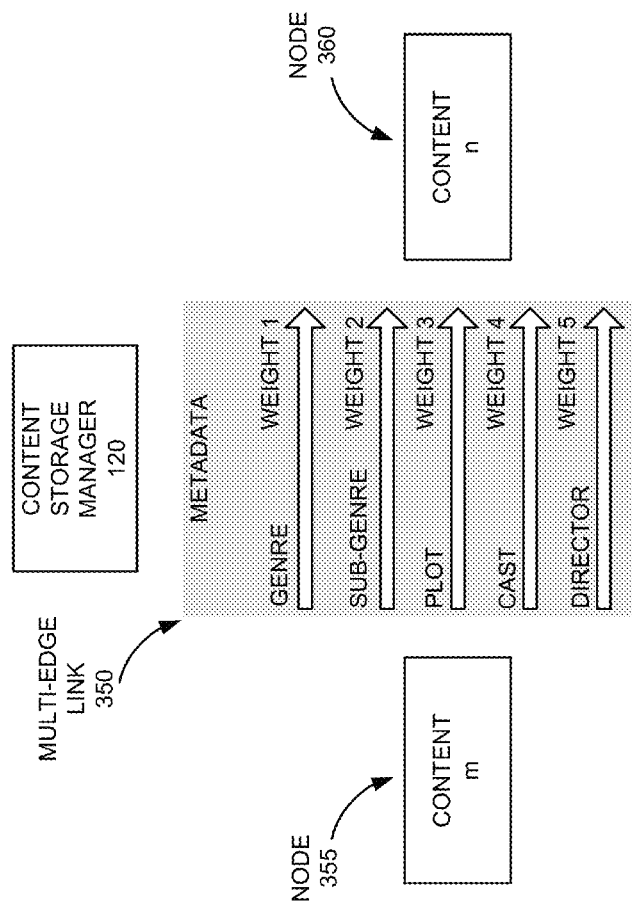

FIG. 3C is a diagram illustrating an exemplary multi-edge link 350 between content "m" and "n" (e.g., nodes 355 and 360). According to this example, multi-edge link 350 may pertain to metadata including genre, sub-genre, plot, cast, and director. As previously described, according to other implementations, other types of metadata may be used. As further illustrated in FIG. 3C, each of the edges included in multi-edge link 350 may be assigned a weight (e.g., weight 1, weight 2, etc.). According to an exemplary implementation, the weight may be a numerical value (e.g., between 0 and 1). According to such an implementation, the summation of each weight associated with the metadata may total to a value above 0 but below 1. When multi-edge link 350 in directed graph 305 has a value of 1, according to an exemplary embodiment, the content connected would be identical. For example, this may occur when two movies are the same, except for format (e.g., 3-D format, standard format, Blu-Ray™ format), assuming metadata pertaining to format is not considered. Content storage manager 120 may include a filtering function to ignore content, which are essentially duplicates, when identifying similar content, and in turn would not be recommended by search engine 110. According to other implementations, each weight may be assigned a numerical value other than a value between 0 and 1 to indicate the strength or degree of similarity between content.

Referring to FIG. 3C, according to an exemplary embodiment, when content "m" and content "n" (i.e., nodes 355 and 360) share the same genre, an edge (or link) exists that has a particular weight. For example, content "m" and content "n" may both be movies of a comedy genre and an edge exists that has a particular weight (e.g., "weight 1"). Similarly, when content "m" and content "n" share the same sub-genre (e.g., romantic comedy), an edge exists that has a particular weight (e.g., "weight 2"). Additionally, when content "m" and content "n" share the same cast member, which may include one or more actors, and the same director, edges exist that have a particular weight (e.g., "weight 4" and "weight 5"). The term "actor" or "actors," as used herein, is intended to include both male and female persons.

According to an implementation, the weight afforded to the cast may be different depending on the cast member. By way of example, when the shared cast member is the lead actor, the weight may have a higher value than when the shared cast member is the supporting actor. Additionally, or alternatively, according to an exemplary implementation, when the shared cast member includes multiple actors, the weights may be additive. According to other implementations, the weight may have a static value regardless of the type of shared cast member(s) and/or the number of shared cast member(s). Additionally, or alternatively, according to an exemplary implementation, the shared cast member(s) may only pertain to the lead actor(s) or both the lead actor(s) and supporting actor(s).

In a similar manner, as described above, the weight afforded to the same crew member (e.g., director, producer, screenplay writer, cinematographer, music, etc.) may be different depending on the crew member. By way of example, when the shared crew member is the director, the weight may have a higher value than when the shared crew member is the producer. According to an exemplary implementation, when the shared crew members include multiple crew members, the weights may be additive. According to other implementations, the weight may pertain to only the director or only to the director and the producer, and/or may have a static value regardless of the shared crew member(s) and/or the number of shared crew member(s). Additionally, other types of metadata, except for metadata pertaining to the plot, which is described further below, may conform to a weighting system similar to that described above.

Unlike other types of metadata, identifying similarities or dissimilarities between plots can be more complex. For example, as previously described, plots are typically written in prose. According to an exemplary embodiment, content storage manager 120 may perform a semantic synthesis of plot metadata to identify similarities between plots associated with content, as described further below.

Figure 4A:
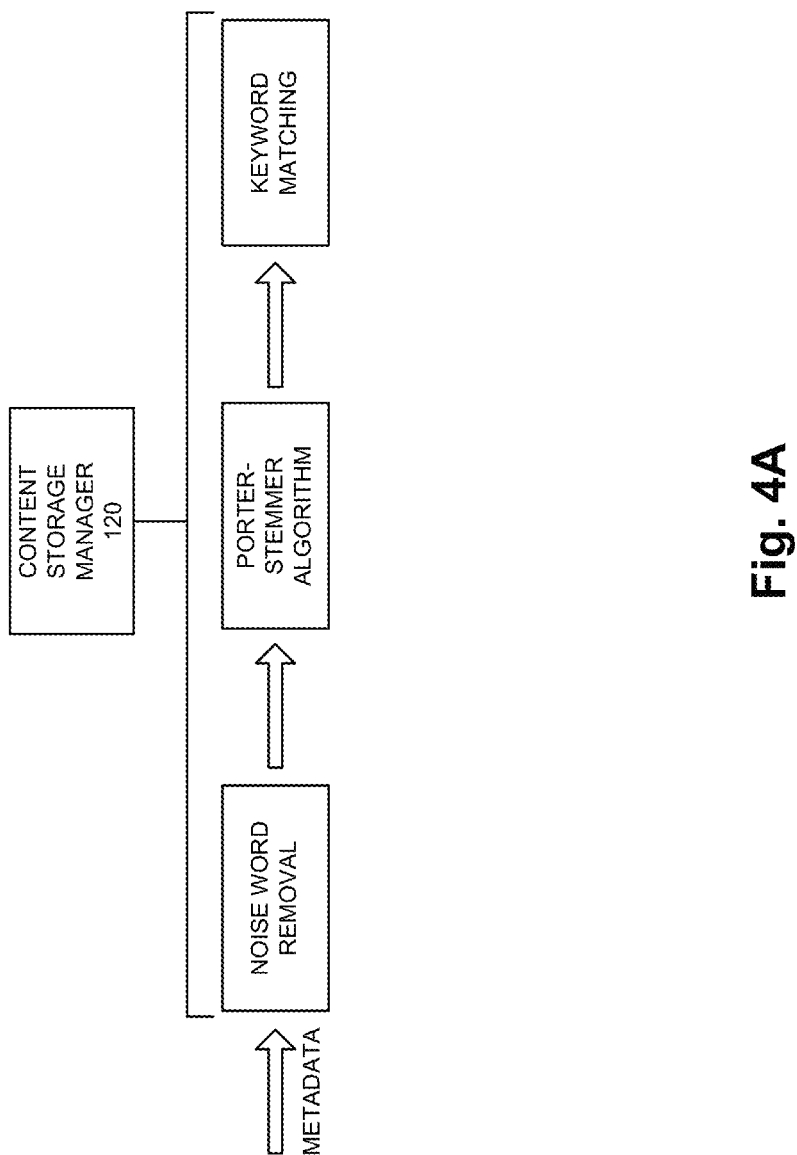
FIGS. 4A and 4B are diagrams illustrating an exemplary process for performing a semantic synthesis of metadata.

FIG. 4A is a diagram illustrating an exemplary process performed by content storage manager 120 for identifying similarities or dissimilarities between plots. According to an exemplary embodiment, content storage manager 120 may obtain plot metadata. For example, plot metadata may be obtained via data mining web sites (e.g., movie review sites, etc.). Alternatively, for example, when service provider network 105 receives content (e.g., from content distributers, etc.), the received content may include plot metadata. Content storage manager 120 may identify the plot metadata (i.e., from other types of metadata) and process the plot metadata according to a noise word removal algorithm. By way of example, a noise word may correspond to a word that does not contribute to the meaning of the prose and/or a word that is primarily required to add sense to a sentence, such as, "and," "to," "at," "the," etc. Additionally, the noise word removal process may significantly reduce the amount of plot metadata to further process.

Figure 4B:
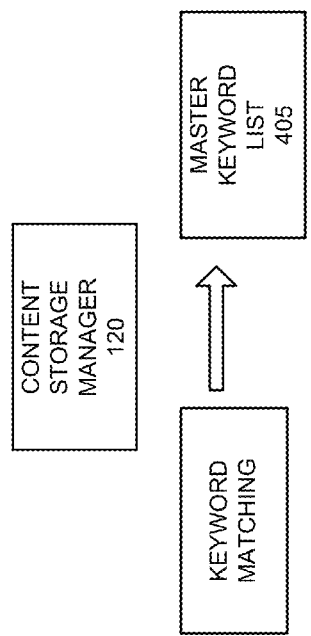

Content storage manager 120 may also identify stem, root or base words by stripping or removing suffixes, etc. For example, content storage manager 120 may use the Porter-Stemmer algorithm or a similar algorithm. Content storage manager 120 may also perform a keyword matching process. For example, as illustrated in FIG. 4B, content storage manager 120 may perform a keyword matching process based on a master keyword list 405. According to an exemplary embodiment, master keyword list 405 may include the most frequently-used words used to describe the plots of content. Master keyword list 405 may be generated by another device (not illustrated) based on a synthesis of plot metadata associated with a repository of content. For example, keywords and/or phrases (e.g., two or more words) may be identified based on their frequency of usage in plot metadata. According to an exemplary implementation, master keyword list 405 may pertain to a global perspective of plot metadata regardless of genre and/or sub-genre. According to another exemplary implementation, master keyword list 405 may include keyword lists based on genre and/or sub-genre.

Content storage manager 120 may match the remaining words of the metadata (e.g., subsequent to the Porter-Stemmer process) with the words included in master keyword list 405 to interpret the plot or gist of the content. Content storage manager 120 may identify shared keywords between content based on the keyword matching process. By way of example, assume two action movies include in their plot the following keywords: "murder," "revenge," "gang," "hunt," "partner," and "explosion." Content storage manager 120 may consider these two movies as having plots that are semantically similar.

According to an exemplary implementation, the weight assigned to the plot edge of multi-edge link 350 may depend on the number of keyword matches. For example, according to an exemplary implementation, the weight of each shared keyword may be additive. Additionally, or alternatively, according to an exemplary implementation, the weight assigned to a shared keyword may depend on the keyword. For example, some keywords may be more common (e.g., more commonly used to describe plots) than other keywords. According to such an implementation, more rarely used keywords may be afforded a higher weight relative to other, keywords. Additionally, the rarity of a keyword may be further measured based on other content metadata. For example, the keyword "kidnap" in a comedy genre or a comedy sub-genre (e.g., romantic comedy) may be rarer relative to "kidnap" in an action genre or an action sub-genre (e.g., crime action).

According to another implementation, the weight assigned to shared keywords may be the same. According to an exemplary implementation, a threshold (e.g., at least a particular threshold number of keywords that match and/or at least a particular threshold weight associated with the keywords that match, etc.) may need to be satisfied before content storage manager 120 identifies that a similarity between plots exists.

Referring back to FIG. 3C, according to an exemplary embodiment, multi-edge link 350 is generated between content "m" and content "n," which in this example, includes genre, sub-genre, plot, cast, and director. Content storage manager 120 may repeat this process with respect to other content.

Figure 4C:
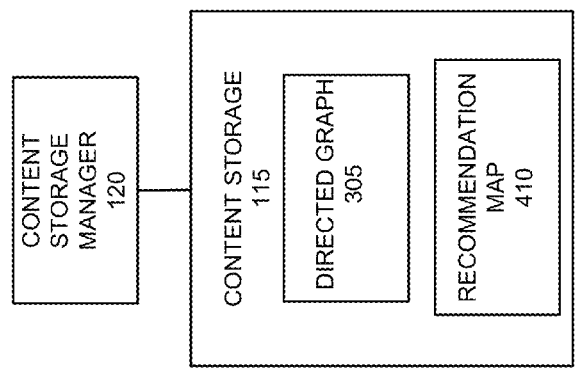
FIG. 4C is a diagram illustrating an exemplary recommendation map.

FIG. 4C is a diagram illustrating a recommendation map 410. For example, content storage manager 120 may select multi-edge link(s) 350 from directed graph 305 that yield the highest similarity with respect to, for example, content "m" based on values associated with each edge of multi-edge links in directed graph 305. Recommendation map 410 may include a data structure that maps content metadata to other content metadata. According to an exemplary implementation, a key to the mapping is based on a content identifier. According to other implementations, the key to the mapping may be based on other data and/or information (e.g., title of the content, etc.).

When a customer conducts a search by entering a search query, search engine 110 provides, in response, via a customer interface (e.g., a graphical user interface) content metadata pertaining to content that matches and/or is relevant to the search query. The content metadata may include an image representative of the content (e.g., a movie poster, a still shot, etc.) and the title of the content. The content metadata may also include, either initially, or upon further navigation by the customer, genre, sub-genre, plot. The customer interface may also permit the customer to play a trailer or other snippet of the content. The customer interface also permits the customer to request to play the content.

Additionally, as previously described, the search result may include recommended content. For example, with respect to content metadata pertaining to each content that matches and/or is relevant to the search query, search engine 110 may retrieve, from recommendation map 410, recommended content metadata pertaining to content that is similar to the content metadata pertaining to content that matches and/or is relevant to the search query.

According to an exemplary implementation, the recommended content metadata may be selected based on a key (e.g., a content identifier, title of the content, etc.) associated with content metadata that matches and/or is relevant to the search query. By way of example, search engine 110 may retrieve a pre-stored list of recommended content metadata for (each) content that matches and/or is relevant to the search query. The list may include recommended content metadata pertaining to one or more content. By way of example, assume that the search query is the string "Time." Search engine 110 may retrieve content metadata that matches the string "Time," such as content metadata pertaining to the movie entitled "Time." Additionally, relevant content metadata may include content metadata pertaining to the movies entitled "Time Bandits," "Time After Time," "The Time Traveler's Wife," "Hot Tub Time Machine," etc. Search engine 110 may also retrieve recommended content metadata pertaining to the matching and/or relevant content metadata. For example, recommended content metadata that is similar (e.g. semantically) to the content metadata pertaining to the movie "Time" may be retrieved. The recommended content metadata may pertain to one or more content. Search engine 110 may also retrieve recommended content metadata pertaining to the movie "Time Bandits," "Time After Time," etc.

The recommended content metadata may indicate content that is semantically similar (e.g., in terms of plot) to the matched and/or relevant content. The recommended content metadata may include metadata as that previously described with respect to the matching and/or relevant content. According to an exemplary implementation, the customer interface may permit the customer to filter recommended content based on the plot metadata. In this way, for example, the customer may obtain content that is similar (e.g., in terms of story-line) to content identified as matching and/or relevant to the search query. According to another implementation, the recommended content metadata provided may be similar based on other metadata, in addition to plot metadata or instead of plot metadata, as previously described.

Figure 5:
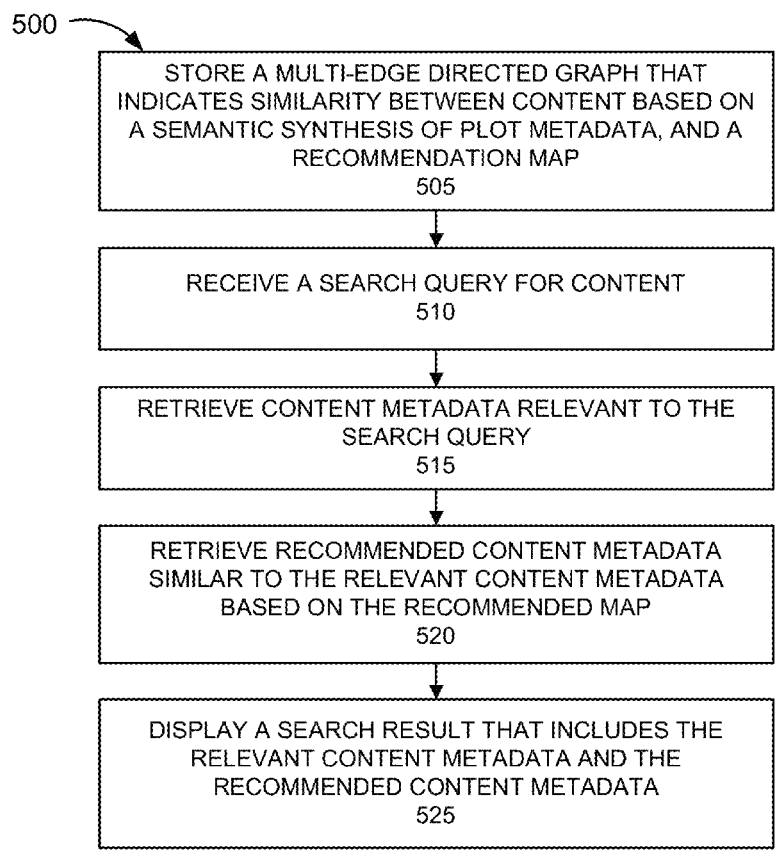
FIG. 5 is a flow diagram illustrating an exemplary process for searching content and providing search results that include the searched content and recommended content.

FIG. 5 is a diagram illustrating an exemplary process 500 for searching content and providing a search result that includes the searched content (e.g., content that is matching or relevant to the search query) and recommended content. According to an exemplary embodiment, process 500 may be performed by search engine 110. According to an exemplary implementation, search engine 110 is implemented on a device that includes a processing system 205 that executes a search engine application.

In block 505, a multi-edge directed graph (e.g., directed graph 305) that indicates similarity between content based on metadata associated with the content is stored in a repository (e.g., content storage 115). As previously described, according to an exemplary embodiment, the strength or degree of similarity between content is based on a semantic synthesis of plot metadata, among other types of metadata pertaining to the content. The repository may also include a recommendation map (e.g., recommendation map 410). The recommendation map includes a mapping or a correlation between content metadata.

In block 510, a search query for content is received. For example, search engine 110 receives a search query for content from a customer via a user interface. The customer may access search engine 110 via a television service, Internet service, and/or mobile service.

In block 515, content metadata relevant to the search query is retrieved. For example, search engine 110 may retrieve content metadata that includes an image representing content matching and/or relevant to the search query. Search engine 110 may retrieve other types of metadata (e.g., metadata pertaining to the cast, the crew, the plot, the title, etc.) pertaining to content that is matching or relevant to the search query. Search engine 110 may retrieve the content metadata from content storage 115 or some other repository (not illustrated in FIG. 1).

In block 520, recommended content metadata similar to the matching or relevant content metadata is retrieved based on directed graph 305 and recommendation map 410. For example, search engine 110 may select recommended content metadata identified as similar according to recommendation map 410, which is based on a synthesis of directed graph 305. Search engine 110 may retrieve image(s) representing the recommended content. Search engine 110 may retrieve other types of metadata (e.g., cast information, crew information, plot, title, genre, sub-genre, trailer, video snippet, etc.) pertaining to the recommended content.

In block 525, a search result that includes the matching and/or relevant content metadata and the recommended content metadata is displayed to the customer. For example, search engine 110 may display a movie poster of the matching and/or relevant content and a movie poster of the recommended content via a user interface. As an example, if the customer searched for a movie entitled "Salt," search engine 110 may provide a movie poster representing the movie "Salt" and the movie posters of other similar movies, such as, "The Bourne Identity," etc.

Although FIG. 5 illustrates an exemplary process 500, according to other implementations, process 500 may include additional operations, fewer operations, or different operations than those illustrated in FIG. 5 and described. By way of example, search engine 110 may be triggered to recommend content (e.g., semantically similar content) based on past purchases and viewing of content (e.g., VoD content, PPV content, etc.). As an example, search engine 110 may provide a user interface that provides recommendations to customers without the user initiating a search for content. Search engine 110 may identify content similar to content previously purchased and viewed by the customer based on the processes previously described.

Figure 6A:
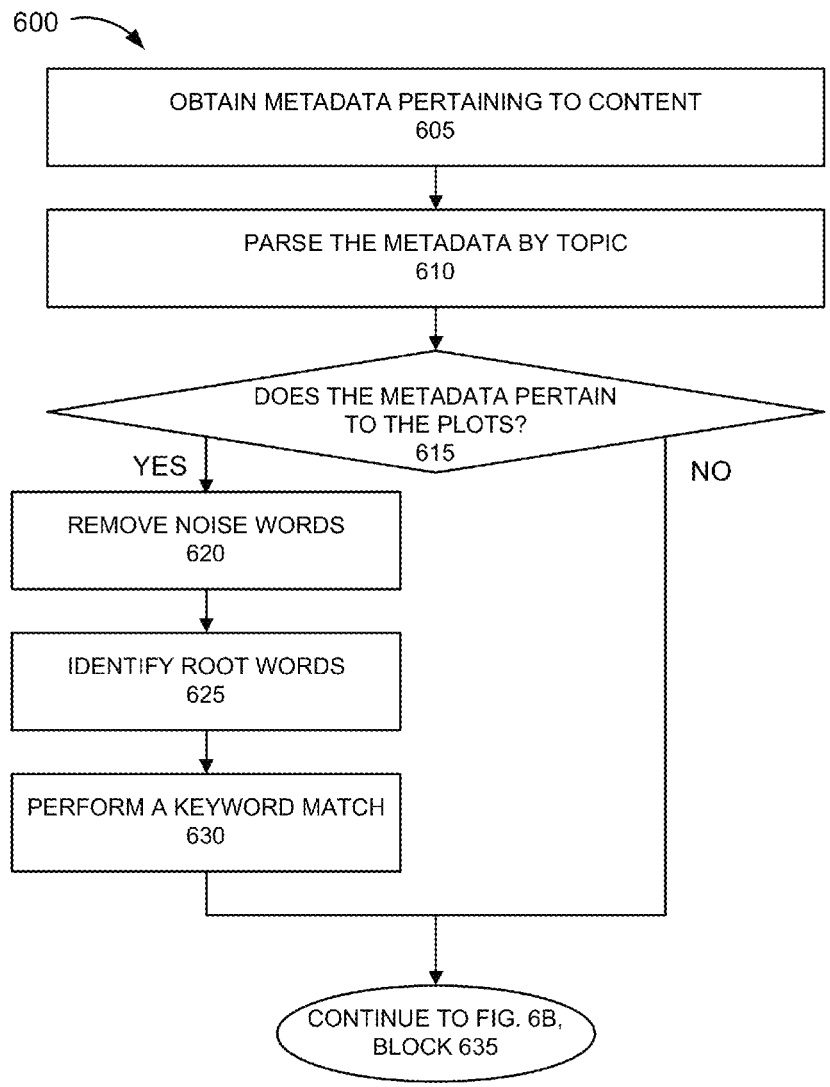
FIGS. 6A and 6B are flow diagrams illustrating an exemplary process for generating a multi-edge directed graph that indicates similarity between content.
Figure 6B:
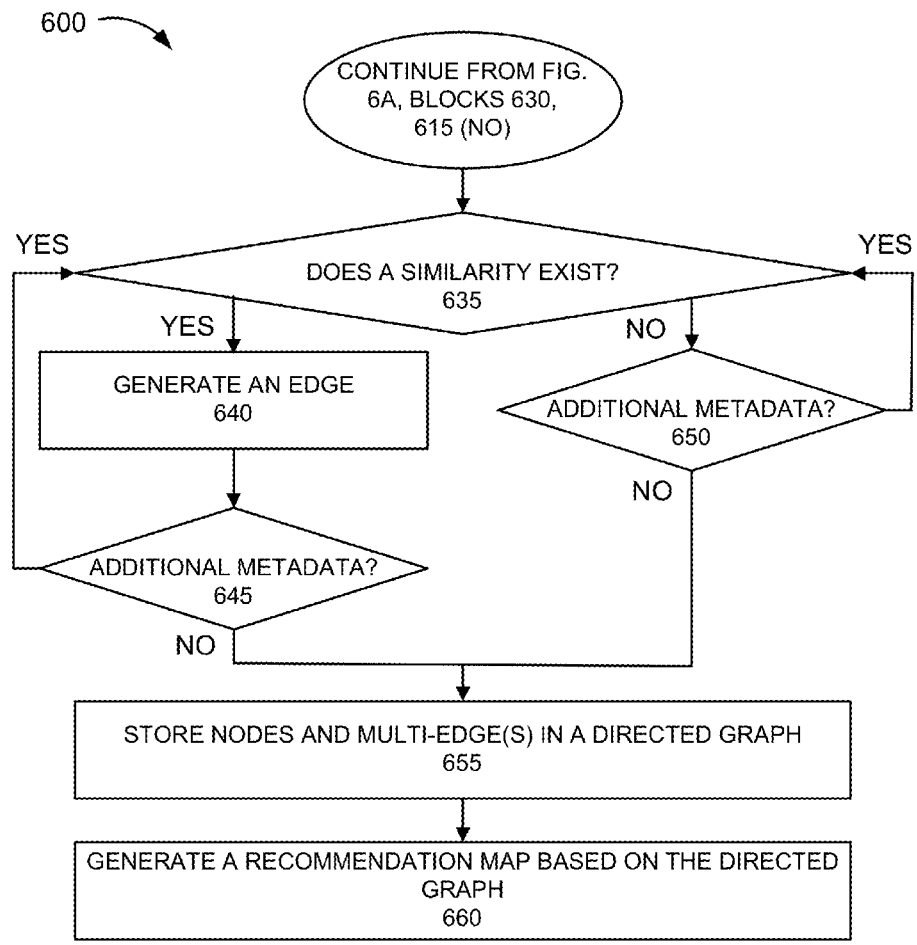

FIGS. 6A and 6B are flow diagrams illustrating an exemplary process 600 for generating a multi-edge directed graph that indicates similarity between content. According to an exemplary embodiment, process 600 may be performed by content storage manager 120. According to an exemplary implementation, content storage manager 120 includes processing system 205 that executes a content similarity application.

Referring to FIG. 6A, in block 605, metadata pertaining to content is obtained. For example, content storage manager 120 or another device may perform data mining for metadata pertaining to content. Alternatively, when service provider network 105 receives content from another party (e.g., a content distributer, etc.), the metadata is made available. Content storage manager 120 or the other device stores the metadata in content storage 115.

In block 610, the metadata is parsed by topic. For example, content storage manager 120 may parse the metadata by topic (e.g. cast, crew, genre, etc.).

In block 615, it may be determined whether the metadata pertains to the plot. For example, content storage manager 120 may identify the plot metadata from the other metadata so that a semantic synthesis of the plot metadata may be performed. If it is determined that the metadata is plot metadata (block 615—YES), content storage manager 120 may perform a semantic synthesis of the plot metadata, as illustrated by blocks 620, 625, and 630. For example, as previously described, in block 620, content storage manager 120 removes noise words from the plot metadata. In block 625, content storage manager 120 identifies root words included in the plot metadata. By way of example, content storage manager 120 may use the Porter-Stemmer algorithm or a similar algorithm. In block 630, content storage manager 120 may perform the keyword matching process to the remaining plot metadata, as previously described. Process 600 continues to block 635, as illustrated in FIG. 6B. If it is determined that the metadata is not plot metadata (block 615—NO), process 600 continues to block 635, as illustrated in FIG. 6B.

Referring to FIG. 6B, in block 635, content storage manager 120 determines whether a similarity exists between the metadata associated with other content. For example, content storage manager 120 determines whether the metadata pertaining to the genre, the sub-genre, the cast, and the director between content are the same. According to other implementations, as previously described, additional, fewer, or different types of metadata may be used to calculate similarities. Additionally, content storage manager 120 may determine whether the metadata pertaining to the plots are similar. When the metadata is similar (block 635—YES), content storage manager 120 generates an edge of a multi-edge link (e.g., multi-edge link 350) (block 640) and determines whether additional metadata for identifying similarity exists (block 645). If there is additional metadata (block 645—YES), process 600 continues to block 635. However, if there is no additional metadata for identifying similarity (block 645—NO), process 600 continues to block 655, as described below.

As also illustrated in FIG. 6B, when the metadata is not similar (block 635—NO), content storage manager 120 determines whether additional metadata for identifying similarity exists (block 650). If there is additional metadata (block 650—YES), process 600 continues to block 635. However, if there is not additional metadata for identifying similarity (block 650—NO), process 600 continues to block 655, as described below.

In block 655, content storage manager 120 stores the nodes corresponding to the content and a multi-edge link, assuming that multiple similarities exist between the content, in the multi-edge directed graph.

In block 660, content storage manager 120 generates a recommendation map based on the directed graph. For example, content storage manager 120 selects content metadata that is similar to another content metadata based on a total value associated with the multi-edge link between nodes. As previously described, the total value or score may be compared to a threshold value. Alternatively, a particular number of nodes may be selected regardless of the score.

Although FIGS. 6A and 6B illustrates an exemplary process 600, according to other implementations, process 600 may include additional operations, fewer operations, or different operations than those illustrated in FIGS. 6A and 6B and described.

The foregoing description of embodiments provides illustration, but is not intended to be exhaustive or to limit the embodiments to the precise form disclosed. Accordingly, modifications to the embodiments described herein may be possible. For example, according to an exemplary embodiment, a customer may configure one or more weights pertaining to the metadata. Content storage manager 120 may use the customer-specified weight(s) to gauge similarity between content, and in turn, search engine 110 may recommend content based on the customer-specified weight(s). For example, the customer may wish to emphasis the lead actor and the genre versus the plot, etc.

Additionally, or alternatively, content storage manager 120 may use other approaches to semantically interpret the plots associated with content. For example, content storage manager 120 may use existing a natural language processing algorithm to understand the meaning of a plot. For example, a natural language algorithm may include probabilistic parsing, word identification (e.g., identifying nouns, verbs, etc.), grammar induction, word sense disambiguation, machine translation, and/or sentence understanding. Content storage manager 120 may compare the understood meaning of one plot with another plot to identify whether content have similar plots.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The phrase "tangible readable medium" is intended to be broadly interpreted to include the storage mediums described in relation to memory/storage 210.

In addition, while series of blocks have been described with regard to the processes illustrated in FIGS. 5, 6A and 6B, the order of the blocks may be modified according to other embodiments. Further, non-dependent blocks may be performed in parallel. Additionally, other processes described in this description may be modified and/or non-dependent operations may be performed in parallel.

An embodiment described herein may be implemented in many different forms of software, firmware, and/or hardware. For example, a process or a function may be implemented as "logic" or as a "component." The logic or the component may include hardware (e.g., processing system 205, etc.), a combination of hardware and software (e.g., application 215), a combination of hardware and firmware, or a combination of hardware, firmware, and software. An embodiment has been described without reference to the specific software code since the software can be designed to implement the embodiment based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
   storing information that indicates similarity between contents based on content metadata associated with each content, wherein a degree of similarity between the contents is based on a semantic interpretation of plot metadata included in each content metadata and pertaining to each plot associated with each content;
   receiving a search query from a user;
   retrieving one or more content metadata pertaining to one or more contents based on the search query;
   semantically interpreting plot metadata of the one or more contents including:
      identifying keywords in the plot metadata of the one or more contents; and
      matching identified keywords with a master list of keywords, wherein the master list of keywords includes a list of most frequently-used words in plot metadata to describe plots of content of a particular genre;
   retrieving one or more recommended content metadata pertaining to one or more recommended contents that are similar to the one or more content metadata pertaining to the one or more contents based on the stored information; and
   providing a search result that includes the one or more content metadata and the one or more recommended content metadata via a user interface.

2. The method of claim 1, wherein the content metadata associated with each content includes types of content metadata comprising genre metadata, sub-genre metadata, cast metadata, and director metadata, and wherein the degree of similarity between the contents is based on the genre metadata, the sub-genre metadata, the cast metadata, and the director metadata.

3. The method of claim 2, further comprising:
   assigning a weight to each type of content metadata; and
   identifying the degree of similarity between the contents based on the assigned weights.

4. The method of claim 3, wherein the identifying comprises:
   calculating a score indicative of the degree of similarity based on a summation of the assigned weights associated with each type of content metadata that are similar between the contents.

5. The method of claim 1, wherein the contents include pay-per-view contents or video-on-demand contents.

6. The method of claim 1, further comprising:
   generating a multi-edge directed graph, wherein nodes of the multi-edge directed graph are the content metadata pertaining to the contents and each edge of a multi-edge link between the contents corresponds to a type of the content metadata, wherein each edge of the multi-edge link is assigned a weight based on the type of the content metadata; and wherein the storing comprises:
storing the multi-edge directed graph as the stored information that indicates similarity between the contents based on the content metadata associated with each content.

7. The method of claim 1, further comprising:
semantically interpreting plot metadata of the one or more recommended contents including:
identifying keywords in the plot metadata of the one or more recommended contents; and
matching identified keywords in the plot metadata of the one or more recommended contents with the master list of keywords; and
determining a degree of similarity between the one or more contents and the one or more recommended contents based on the semantically interpreting the plot metadata of the one or more contents and the one or more recommended contents.

8. The method of claim 7, wherein the semantically interpreting further comprises:
removing noise words from the plot metadata of the one or more contents and the one or more recommended contents, and wherein when matching the identified keywords with the master list, a weight of a shared keyword is based on a measure of how common or how rare a keyword is used to describe plots of content of the particular genre.

9. A method comprising:
receiving content metadata pertaining to contents;
comparing content metadata between each content;
identifying a degree of similarity between the contents based on a semantic interpretation of the content metadata associated with each compared content, wherein the semantic interpretation is derived from a natural language algorithmic processing of plot metadata included in each content metadata pertaining to each compared content, and the identifying further comprising:
semantically interpreting each plot metadata, wherein the semantically interpreting includes:
identifying keywords in each plot metadata based on the natural language algorithmic processing;
storing a master list of keywords, wherein the master list of keywords includes a list of most frequently-used words in plot metadata to describe plots of content of a particular genre;
matching the identified keywords with the master list of keywords; and
identifying the degree of similarity between the compared contents based on the matching;
storing information based on the identifying, wherein the information includes recommended content metadata pertaining to recommended contents that are similar to other contents; and
providing recommended content metadata via a user interface.

10. The method of claim 9, further comprising:
receiving a search query for content from a user, and wherein the providing includes:
providing a search result that includes one or more content metadata pertaining to one or more contents based on the search query and one or more recommended content metadata pertaining to one or more recommended contents that are similar to the one or more content metadata pertaining to the one or more contents.

11. The method of claim 9, wherein the contents include movies.

12. The method of claim 9, further comprising:
assigning a weight to each type of content metadata; and
identifying the degree of similarity between the contents based on the assigned weights.

13. A system comprising:
a first network device, comprising:
a first communication interface;
a first memory, wherein the first memory stores first instructions; and
a first processor, wherein the first processor executes the first instructions to:
obtain content metadata associated with contents;
identify plot metadata included in each content metadata associated with the contents;
semantically interpret plot metadata between the contents including:
identify keywords in the plot metadata associated with the contents; and
match the identified keywords with a master list of keywords, wherein the master list of keywords includes a list of most-frequently-used words in plot metadata to describe plots of content of a particular genre;
determine whether plots are similar based on semantic interpretations of the plot metadata;
determine whether other types of metadata included in the content metadata associated with the contents are similar between the contents, wherein the other types of metadata include genre metadata and cast metadata; and
generate information that indicates a degree of similarity between the contents.

14. The system of claim 13, wherein the first processor further executes the first instructions to:
assign a weight to each type of metadata include in the content metadata; and
calculate the degree of similarity between the contents based on the assigned weights.

15. The system of claim 13, wherein the first processor further executes the first instructions to:
generate a multi-edge directed graph, wherein nodes of the multi-edge directed graph are the content metadata associated with the contents and each edge of a multi-edge link between the contents corresponds to a type of content metadata, wherein each edge of the multi-edge link is assigned a weight based on the type of content metadata; and
store the multi-edge directed graph as the information that indicates the degree of similarity between the contents based on the content metadata associated with each content.

16. The system of claim 13, wherein the contents include movies.

17. The system of claim 13, wherein the content metadata pertaining to each content includes genre metadata, sub-genre metadata, cast metadata, and director metadata, and wherein the degree of similarity between contents is based on the genre metadata, the sub-genre metadata, the cast metadata, and the director metadata.

18. The system of claim 13, further comprising:
a second network device, comprising:
a second communication interface;
a second memory, wherein the second memory stores second instructions; and a second processor, wherein the second processor executes the second instructions to:
receive, via the second communication interface, a search query for content from a user;
retrieve one or more content metadata pertaining to one or more contents that at least one of matches or is relevant to the search query;
retrieve one or more recommended content metadata pertaining to one or more recommended contents that are similar to the one or more content metadata based on the information stored at the first network device; and
send a search result, via the second communication interface, wherein the search result includes the one or more content metadata and the one or more recommended content metadata.

19. The system of claim 18, wherein the one or more contents and the one or more recommended contents include pay-per-view contents or video-on-demand contents.

20. The system of claim 18, wherein the first network device stores the information.

\* \* \* \* \*